(12) United States Patent
Hammerschmidt et al.

(10) Patent No.: US 7,543,491 B2
(45) Date of Patent: Jun. 9, 2009

(54) CAPACITIVE MEASUREMENT OF TIRE DEFORMATION

(75) Inventors: Dirk Hammerschmidt, Villach (AT); Terje Kvisteroey, Horten (NO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/857,445

(22) Filed: Sep. 19, 2007

(65) Prior Publication Data

US 2009/0071237 A1 Mar. 19, 2009

(51) Int. Cl.
*B60C 23/02* (2006.01)
(52) U.S. Cl. .................................... 73/146.5
(58) Field of Classification Search ............... 73/146, 73/146.5
See application file for complete search history.

(56) References Cited

U.S. PATENT DOCUMENTS

2005/0016649 A1* 1/2005 Poulbot et al. ........... 152/154.2
2007/0272006 A1* 11/2007 Demaie et al. ............... 73/146

FOREIGN PATENT DOCUMENTS

| EP | 1186853 A2 | 3/2002 |
| EP | 1526385 B1 | 8/2006 |
| WO | 2005108123 A1 | 11/2005 |

OTHER PUBLICATIONS

Matsuzaki et al., Wireless strain monitoring of tires using electrical capacitance changes with an oscillating circuit, Sensors and Actuators A 119, 2005, 323-331. Elsevier (9 pages).
Sergio et al., On road tire deformation measurement system using a capacitive-resistive sensor, IEEE, 2003, 1059-1063, 0-7803-8133-5/03 (5 pages).

* cited by examiner

*Primary Examiner*—Andre J Allen
(74) *Attorney, Agent, or Firm*—Infineon Technologies Patent Dept.

(57) ABSTRACT

The invention relates to systems and methods for detecting and monitoring tire deformation. In one embodiment, a tire deformation detection system comprises a first electrode, a second electrode, circuitry, and a central control unit. The first electrode is coupled to an interior surface of a tire. The second electrode is coupled to an interior surface of the tire and configured with the first electrode to form a first capacitor. The circuitry is configured to measure a first capacitance of the first capacitor. The central control unit is configured to detect a deformation of the tire based at least in part on the first capacitance.

19 Claims, 5 Drawing Sheets

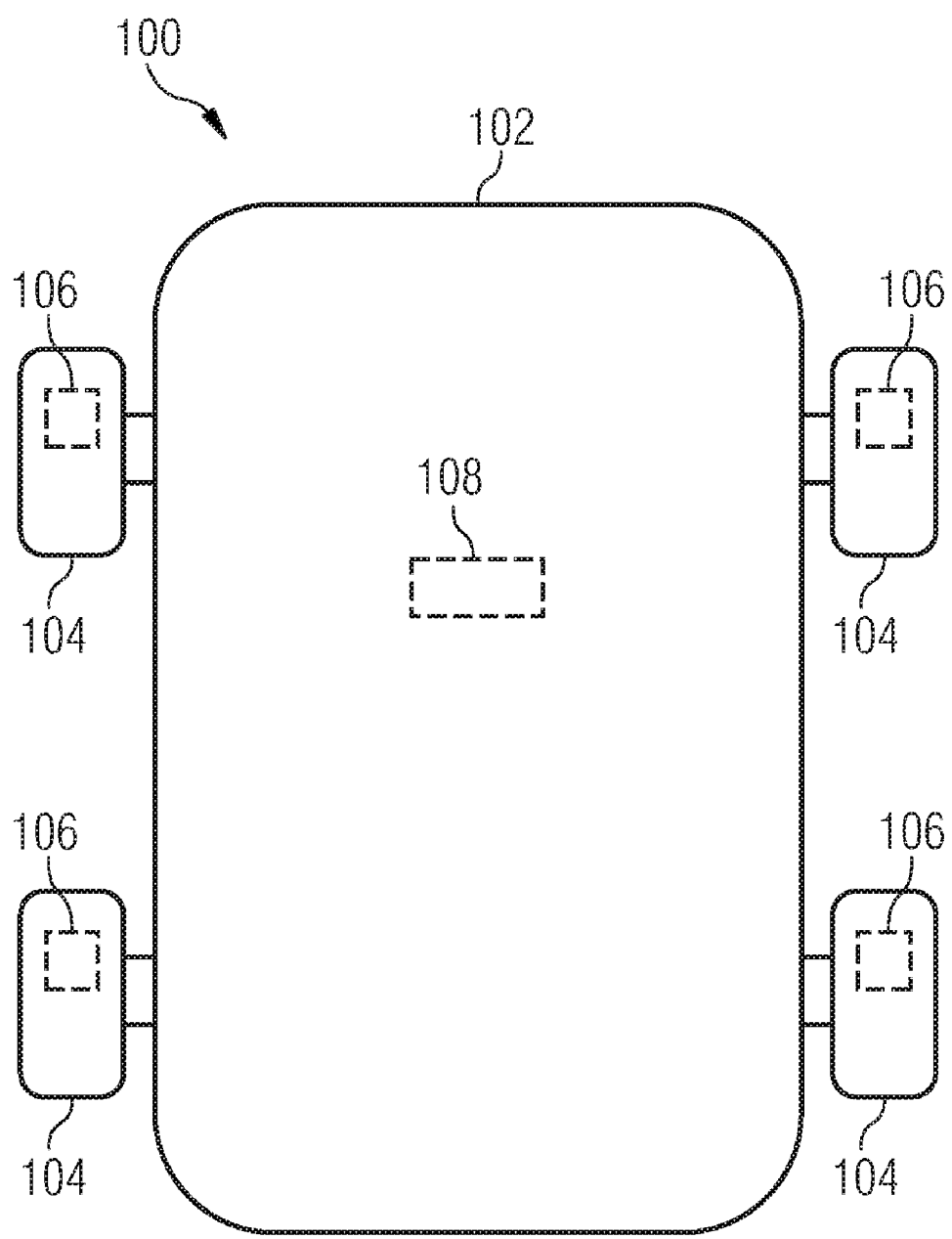

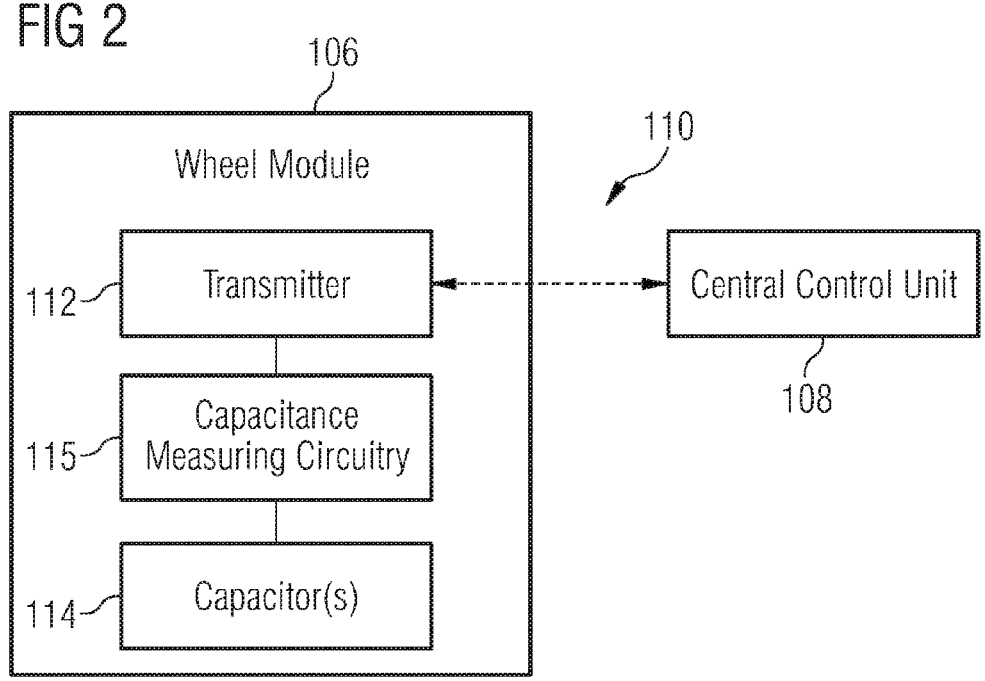
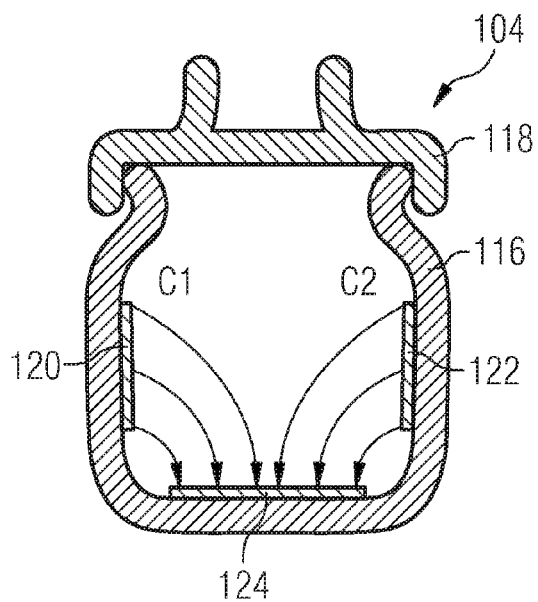
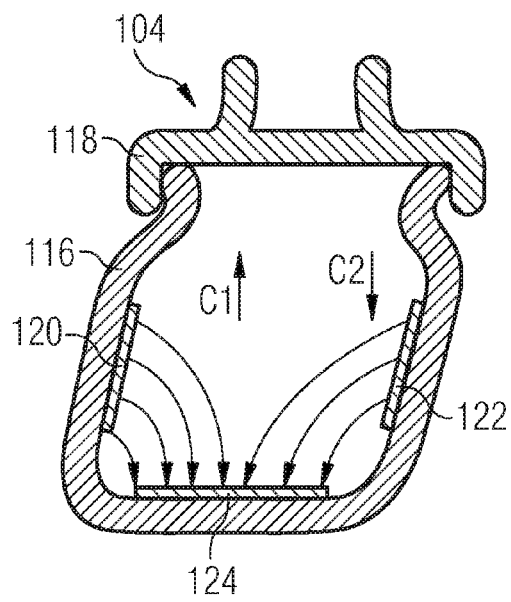

CAPACITIVE MEASUREMENT OF TIRE DEFORMATION

FIELD OF THE INVENTION

The invention generally relates to intelligent tire systems. More particularly, the invention relates to capacitive measurement and monitoring of conditions and characteristics related to vehicle tires.

BACKGROUND OF THE INVENTION

Vehicle tires are subjected to a variety of forces during vehicle operation. One example is shear stress, which is related to and can affect vehicle traction. Because shear stress forces are well known from motor and traction management perspectives, the shear stress can be used to calculate the forces between the tire and the road. Knowledge of these forces is paramount for vehicle stability control.

Vehicles typically do not measure the stress in the tire or the forces between a road surface and a tire. Ideas exist to use accelerometers, force sensors, or optical sensors to determine the form and area of the contact between wheel and road, which could provide a meaningful measure of the aforementioned forces. These ideas, however, have generally not been implemented with desired levels of success. The need for a practical and complete solution to the measurement of shear and other stresses in a tire therefore remains.

SUMMARY OF THE INVENTION

The invention relates to systems and methods for detecting and monitoring tire deformation. In one embodiment, a tire deformation detection system comprises a first electrode, a second electrode, circuitry, and a central control unit. The first electrode is coupled to an interior surface of a tire. The second electrode is coupled to an interior surface of the tire and configured with the first electrode to form a first capacitor. The circuitry is configured to measure a first capacitance of the first capacitor. The central control unit is configured to detect a deformation of the tire based at least in part on the first capacitance.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which:

FIG. 1 depicts a vehicle according to an embodiment of the invention.

FIG. 2 depicts a block diagram of a system according to an embodiment of the invention.

FIG. 3A depicts a partial cross-section of a tire according to an embodiment of the invention.

FIG. 3B depicts another partial cross-section of a tire according to an embodiment of the invention.

Figure 4:
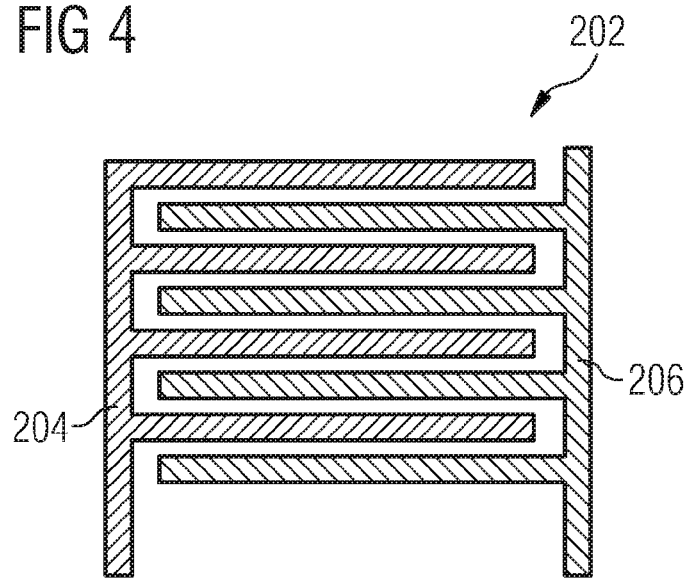
FIG. 4 depicts an interdigital capacitor configuration according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to next-generation intelligent tire systems, such as systems and methods for capacitive measurement and monitoring of conditions and characteristics related to vehicle tires. Various embodiments of the invention can provide additional information about a tire, its real-time condition, and its interaction with a driving surface, thereby improving vehicle and passenger safety. The invention can be more readily understood by reference to FIGS. 1-8 and the following description. While the invention is not necessarily limited to the specifically depicted application(s), the invention will be better appreciated using a discussion of exemplary embodiments in specific contexts.

Referring to FIG. 1, an intelligent tire system (ITS) 100 according to an embodiment of the invention is depicted. ITS 100 is implemented in a vehicle 102, which can comprise an automobile, SUV, truck, semi-truck, bus, motorcycle, or other vehicle having two, four, or some other number of wheels and tires. As depicted and described in the example that follows, vehicle 102 has four wheels 104 and is but one example of a suitable vehicle for implementing embodiments of ITS 100.

Typically, each wheel 104 comprises a tire including an inner liner that lines the inside of the tire, multiple ply layers over the inner liner, and one or more steel belts over the ply layers. A cushion layer and a base layer are situated over the steel belts and a cap layer, also referred to as the tread layer, is situated on the outside of the tire over the base layer. The tread interacts with the road surface to provide traction. The entire tire structure is then mounted on a rim, forming wheel 104, and coupled to an axle of vehicle 102.

In one embodiment of the invention, each wheel 104 includes a wheel module 106 of a capacitive measurement and monitoring system. In other embodiments, fewer than all wheels 104 comprise wheel modules 106. Each wheel module 106 is in communication with a central control unit 108. In the embodiment depicted, central control unit 108 is mounted in vehicle 102. In other embodiments, central control unit can be external to vehicle 102.

Referring to FIG. 2, wheel module 106 and central control unit 108 comprise a capacitive measurement and monitoring system 110. Wheel module 106 comprises a transmitter 112 configured to communicate with central control unit 108. In one embodiment, transmitter 112 and central control unit 108 comprise radio frequency (RF) transmitters or transceivers. Wheel module 106 further comprises at least one capacitor 114 and capacitance measuring circuitry 115, which are described in more detail below. In various embodiments, wheel module 106 also comprises a microcontroller, power supply, and other circuitry (not shown).

Referring now to FIGS. 3A and 3B, wheel 104 is depicted and comprises a tire 116 mounted on a rim 118. Two electrodes 120 and 122 are mounted to the inner sidewall of tire 116, and a third electrode 124 is mounted to the inner liner opposite the external tread of tire 116. Together, electrodes 120 and 124 form a first capacitor C1, and electrodes 122 and 124 a second capacitor C2. Capacitors C1 and C2 comprise capacitors 114 of wheel module 106 and capacitive measurement and monitoring system 110 depicted in FIG. 2.

In one embodiment, capacitors C1 and C2 are configured to detect deformation of tire 116 by measuring a relative shift of electrodes 120 and 124 and of electrodes 122 and 124. A relative shift of electrodes 120 and 124 and electrodes 122 and 124 alters a capacitance of capacitors C1 and C2, respectively. In a parallel plate capacitor, capacitance is inversely proportional to a distance separating the plates, as shown by the following equation:

$$C \approx \frac{\varepsilon A}{d}$$

where $\varepsilon$ is the permittivity of the dielectric, A is the area of the plates, and d is the distance between the plates.

In FIG. 3A, tire 116 is in a neutral position. In this position, capacitors C1 and C2 are approximately symmetric, and the distances separating electrodes 120 and 124 and electrodes 122 and 124 are substantially the same.

In FIG. 3B, tire 116 is deformed. Deformation can be caused by centrifugal forces acting on tire 116 as vehicle 102 passes through a curve; contact forces in the interface between tire 116 and a driving surface; a mechanical or maintenance issue related to tire 116, wheel 104, or vehicle 102; or some other cause of an uneven, irregular, or unexpected deformation of tire 116. Because of the deformation, the distance between electrodes 120 and 124 decreases, increasing capacitance C1 and decreasing capacitance C2.

The capacitances of capacitors C1 and C2 can be measured by capacitance-measuring circuitry 115. In one embodiment, circuitry 115 comprises at least one capacitance-measuring integrated circuit (IC). The values and/or changes in the values of capacitors C1 and C2 can then be transmitted out of tire 116 by transmitter 112 to central control unit 108. Central control unit 108 can provide an alert, such as a visual indicator on a dashboard of vehicle 102, an audible indicator provided through a sound system of vehicle 102, or some combination thereof, to a driver or operator after receiving data or information indicating a condition exists with respect to tire 116. Alerts can be provided when a maximum or minimum capacitance is exceeded, when a difference between capacitors C1 and C2 exceeds a threshold, or according to some other circumstance related to measured values of one or both of C1 and C2 that provides worthwhile and real-time status and safety information to a driver or operator.

In another embodiment, one of capacitors C1 and C2 is used as the capacitive load of an RF resonator, such as an Xtal, SAW, or BAW. A change of the capacitance of the capacitor C1 or C2 slightly changes the resonance of the resonator. When stimulated with a carrier at its average resonance frequency, the resonator, which is connected to an antenna, stores energy. If the carrier is turned off, the resonator maintains the oscillation until the stored energy is exhausted and thus transmits backwards via its antenna (backscatter). Depending on the variable load capacitance, the phase of the response is different from the stimulating transmission, which can be measured outside tire 116 by receiving and demodulating the response. The change in response, caused by the change in one of C1 and C2 because of a change in tire 116, can thus be detected and subsequently reported by central control unit 108, similar to as described above.

FIG. 4 depicts another embodiment of the invention comprising an interdigital capacitor 202. Interdigital capacitor 202 comprises two interleaved electrodes 204 and 206, each comprising a plurality of longitudinal structures. In general, interdigital capacitor 202 can be used to measure any kind of tire deformation if placed on the radius of a deflecting wall of a tire. Thus, interdigital capacitor 202 can be used to characterize deflection of the sidewall of a tire and also of the tread area at the inner liner. Electrodes 204 and 206 of interdigital capacitor 202 are shifted if the material is stressed, and the angle towards and distance between portions of electrodes 204 and 206 is changed the more the wall is deflected.

Figure 5A:
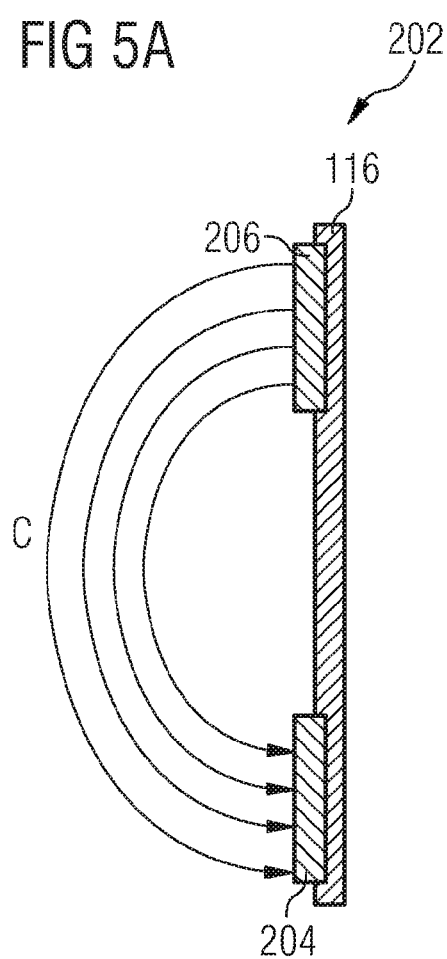
FIG. 5A depicts an interdigital capacitor configuration according to an embodiment of the invention.

Referring to FIG. 5A, interdigital capacitor 202 is mounted to tire 116, such as on an interior sidewall surface. Tire 116 is in a neutral or non-deformed state, and a capacitance C is formed by electrode 204 and electrode 206.

Figure 5B:
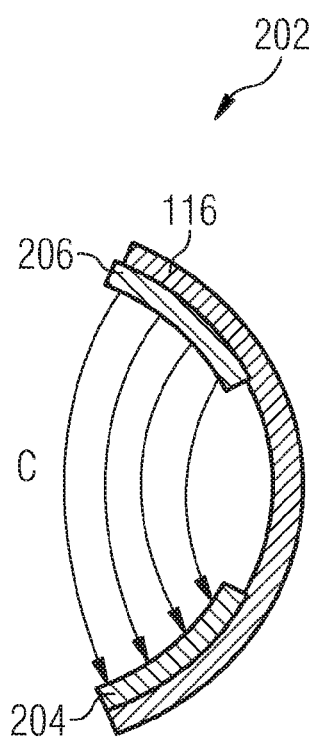
FIG. 5B depicts an interdigital capacitor configuration according to an embodiment of the invention.

In FIG. 5B, tire 116 is deformed, changing the angle and therefore the distance between interdigital portions of each of electrodes 204 and 206. The deformation and altered disposition of electrodes 204 and 206 relative to each other increases capacitance C.

Figure 6:
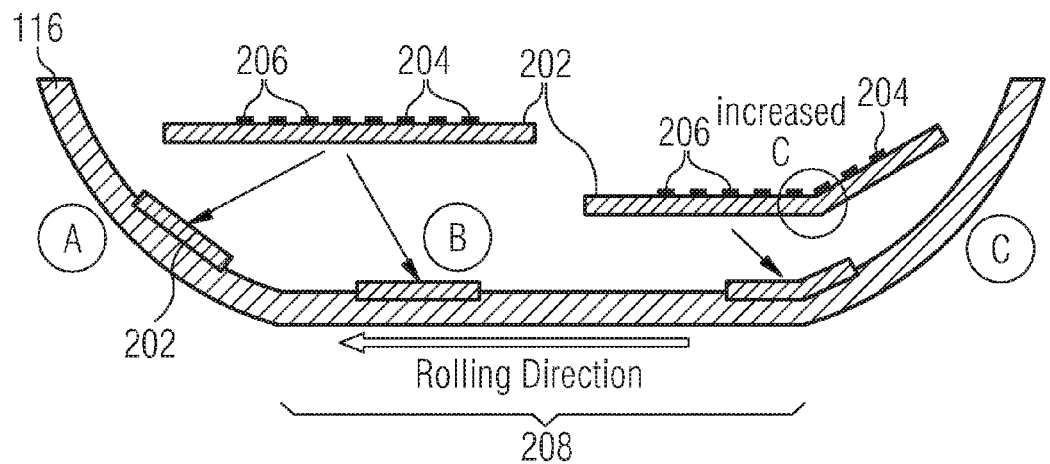
FIG. 6 depicts a partial cross-section of a tire according to an embodiment of the invention.

In FIG. 6, interdigital capacitor 202 is applied to the inner liner of tire 116 opposite the exterior tread or contact area 208. In one embodiment, only a single interdigital capacitor 202 is affixed to tire 116. In other embodiments, a plurality of interdigital capacitors are affixed to tire 116 and can be spaced apart from each other along an inner circumference of tire 116.

As tire 116 rotates in the direction shown, interdigital capacitors 202 move into and out of a contact area 208 where tire 116 meets a driving surface. When fully out of contact area 208, such as at A, and when fully within contact area 208, such as at B, interdigital capacitor 202 is substantially planar or only slightly deformed, with electrodes 204 and 206 spaced as shown in FIG. 5A. When transitioning into or out of contact area 208, such as at C, interdigital capacitor 202 undergoes a more significant deformation. This deformation alters the spatial relationship between adjacent longitudinal structures of electrodes 204 and 206, such as illustrated above in FIG. 5B, increasing a capacitance C of interdigital capacitor 202. By measuring the time between the two adjacent edges of one or more capacitors 202 during motion of tire 116, the length of contact area 208, also referred to as the "footprint" of tire 116, can be determined. This determination can be made by capacitance-measuring circuitry or a microcontroller local to tire 116 or by a central control unit to which data from tire 116 is wirelessly transmitted, similar to as described above with reference to FIGS. 2, 3A, and 3B.

Figure 7:
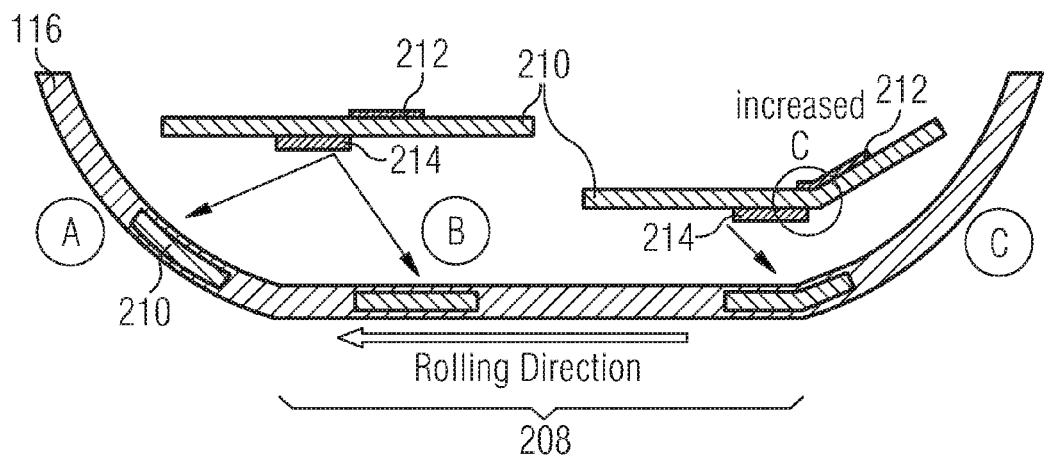
FIG. 7 depicts a partial cross-section of a tire according to an embodiment of the invention.

Referring to FIG. 7, an embedded capacitor 210 is depicted according to another embodiment of the invention. Embedded capacitor 210 comprises a first electrode 212 and a second electrode 214 and is embedded within tire 116 such that first electrode 212 is at a first depth and second electrode 214 at a second depth different from the first. As tire 116 rotates in the direction indicated and embedded capacitor 210 passes into and out of contact area 208, first electrode 212 is compressed and second electrode 214 is stretched, given the difference in depths. The change in size and relative orientation and distance between the two electrodes 212 and 214 will alter a capacitance of embedded capacitor 210. Similar to interdigital capacitor 202 of FIG. 6, the time between the two adjacent edges of one or more embedded capacitors 210 during motion of tire 116 can be measured, and the length of contact area 208, also referred to as the "footprint" of tire 116, can be determined. This determination can be made by capacitance-measuring circuitry or a microcontroller local to tire 116 or by a central control unit to which data from tire 116 is wirelessly transmitted, similar to as described above with reference to FIGS. 2, 3A, and 3B.

In other embodiments, interdigital capacitor 202 and embedded capacitor 210 can be applied to or embedded within, respectively, the sidewall of tire 116 or, when disposed as depicted in FIGS. 6 and 7, can be used to detect other conditions, characteristics, and qualities of tire 116. Interdigital capacitor 202 and embedded capacitor 210 can also be used to detect penetrations or punctures of tire 116. For example, in an embodiment in which a plurality of interdigital capacitors 202 are applied to tire 116, a severing or breakage of one or both of electrodes 204 and 206 of one the capacitors 202 when punctured by a nail or other object could be detected and reported. A similar embodiment is contemplated with respect to embedded capacitor 210. Additional embodiments can comprise various combinations of interdigital capacitors 202, embedded capacitors 210, and/or capacitors C1 and C2 arranged in one or more vehicle tires.

Figure 8:
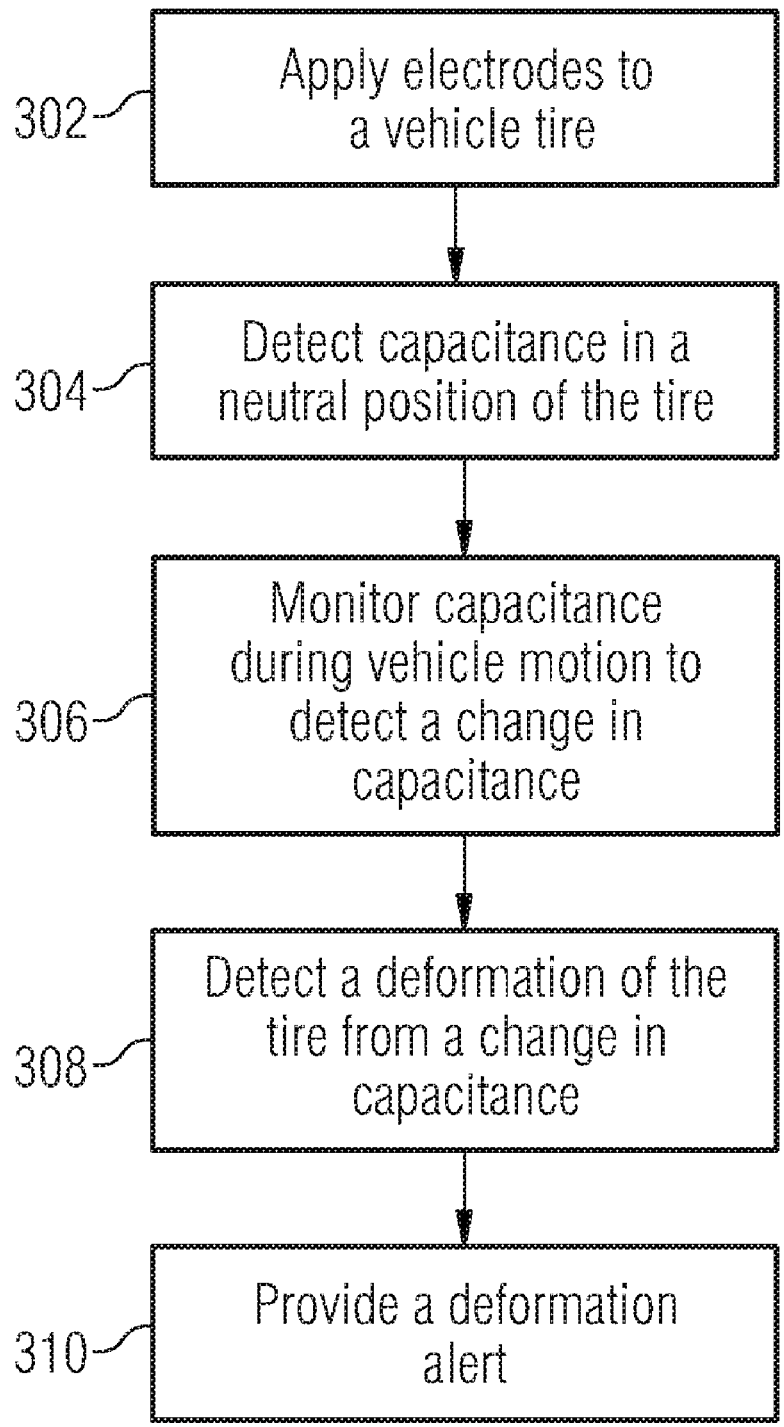
FIG. 8 depicts a flowchart of a method according to an embodiment of the invention.

In use, and referring to FIG. 8, a plurality of capacitor-forming electrodes are applied to a tire at step 302. In one embodiment, the electrodes are similar to those depicted and described in the embodiment of FIGS. 3A and 3B. In another embodiment, the electrodes are interwoven and form an interdigital capacitor, similar to the depiction and description related to the embodiment of FIGS. 4-6. In further embodiments, other electrodes configurations or combinations thereof are applied to a tire. In any embodiment, applying the electrodes to the tire can comprise adhering, mounting, integrally forming, embedding, coupling, or otherwise affixing the electrodes to a surface of the tire during or after manufacture of the tire itself.

At step 304, a capacitance of the electrodes is detected in a neutral or normal state of the tire. Step 304 can take place when a vehicle is initially started and idling before motion, periodically during operation when the vehicle slows or stops, or at some other time.

The capacitance of the electrodes is monitored during vehicle motion and use at step 306. Monitoring can comprise periodically checking the capacitance and comparing the real-time capacitance with the neutral state capacitance of step 304, a maximum or minimum capacitance, another detected capacitance if multiple capacitors are arranged, or some other meaningful value. If an appropriate change or value is detected during monitoring, a deformation is detected at step 308 and can be reported via an alert at step 310.

Embodiments of the invention therefore can detect changes in capacitance related to a change in the state of a tire. The change can be detected and monitored in real time, and an alert can be provided to a driver or operator. The invention thus increases the information available regarding tire status and can improve vehicle and driver safety when implemented.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A tire deformation detection system comprising:
   a first electrode coupled to an interior sidewall surface of a tire;
   a second electrode coupled to an interior tread portion surface of the tire and configured with the first electrode to form a first capacitor;
   circuitry configured to measure a first capacitance of the first capacitor; and
   a central control unit configured to detect a deformation of the tire based at least in part on the first capacitance.

2. The tire deformation detection system of claim 1, further comprising a third electrode coupled to an interior sidewall surface of the tire opposite the first electrode, the third electrode configured with the second electrode to form a second capacitor.

3. The tire deformation detection system of claim 2, wherein the central control unit is further configured to detect a deformation of the tire based at least in part on the second capacitance.

4. The tire deformation detection system of claim 2, wherein the central control unit is further configured to detect a deformation of the tire based on a comparison of the first capacitance and the second capacitance.

5. The tire deformation detection system of claim 1, further comprising a wireless transmitter configured to communicate the first capacitance from the circuitry to the central control unit.

6. The tire deformation detection system of claim 1, wherein the circuitry is mounted local to the tire and comprises an integrated circuit.

7. The tire deformation detection system of claim 1, further comprising an alert system in communication with the central control unit and configured to provide an indicator of a detected deformation.

8. A tire deformation monitoring system comprising:
   a first capacitor associated with a tire and having a first capacitance in a tire neutral state and a second capacitance in a tire deformed state;
   a second capacitor affixed to the tire and having a first capacitance in a tire neutral state and a second capacitance in a tire deformed state; and
   an integrated circuit coupled to the first capacitor and adapted to measure the second capacitance and detect the tire deformed state,
   wherein the first and second capacitor each comprise a first electrode affixed to an inner sidewall portion of the tire and a second electrode affixed to an inner tread portion of the tire.

9. The tire deformation monitoring system of claim 8, further comprising a deformation detection circuit in communication with the integrated circuit and adapted to report the tire deformed state.

10. The tire deformation monitoring system of claim 8, wherein the first electrode of the first capacitor and the first electrode of the second capacitor are arranged on opposing inner sidewall portions of the tire, and wherein the second electrode of the first capacitor and the second electrode of the second capacitor comprise a common electrode structure arranged between the first electrodes of the first and second capacitors.

11. A method of detecting a tire deformation comprising:
    coupling a first electrode to a sidewall portion of a tire and a second electrode to a tread portion of the tire;

measuring a neutral tire position capacitance between the first electrode and the second electrode in a tire monitoring a capacitance between the first electrode and the second electrode;

comparing the capacitance with the neutral tire position capacitance; and detecting tire deformation based on the step of comparing.

12. The method of claim 11, further comprising coupling a third electrode to the sidewall portion of the interior of the tire opposite the first electrode; and monitoring a capacitance between the second electrode and the third electrode.

13. The method of claim 11, further comprising determining a length of a footprint of the tire.

14. A method of detecting a tire deformation comprising the steps of:

mounting a first capacitor and a second capacitor in an interior of a tire;

monitoring a capacitance of the first capacitor and a capacitor of the second capacitor;

detecting a change in the first capacitance relative to the second capacitance; and detecting tire deformation if the change exceeds a predetermined threshold.

15. A method of detecting a tire deformation comprising the steps of:

mounting an interdigital capacitor in an interior of a tread portion of a tire;

monitoring a capacitance of the interdigital capacitor during rotation of the tire;

detecting adjacent edges in a change in the capacitance;

determining a time between the adjacent edges; and determining a dimension of a tire contact area deformation from the time.

16. A tire deformation detection system comprising:

a first electrode coupled to an interior surface of a tire;

a second electrode coupled to the interior surface of the tire and interleaved with the first electrode to form an interdigital capacitor; and circuitry configured to measure a capacitance of the interdigital capacitor to detect a deformation of the tire.

17. The tire deformation detection system of claim 16, wherein the deformation comprises a change in a length of a contact area between the tire and a driving surface.

18. The tire deformation system of claim 16, wherein the interior surface of the tire comprises an interior surface of a tread portion of the tire.

19. A method of detecting a tire deformation comprising:

embedding a first electrode at a first depth within a tire;

embedding a second electrode at a second depth within the tire;

measuring a neutral tire position capacitance between the first electrode and the second electrode;

monitoring a capacitance between the first electrode and the second electrode;

comparing the capacitance with the neutral tire position capacitance; and detecting tire deformation based on the comparing.

* * * * *